F. D. HOWE.
SPRING SUSPENSION.
APPLICATION FILED NOV. 1, 1920.
1,436,803.
Patented Nov. 28, 1922.
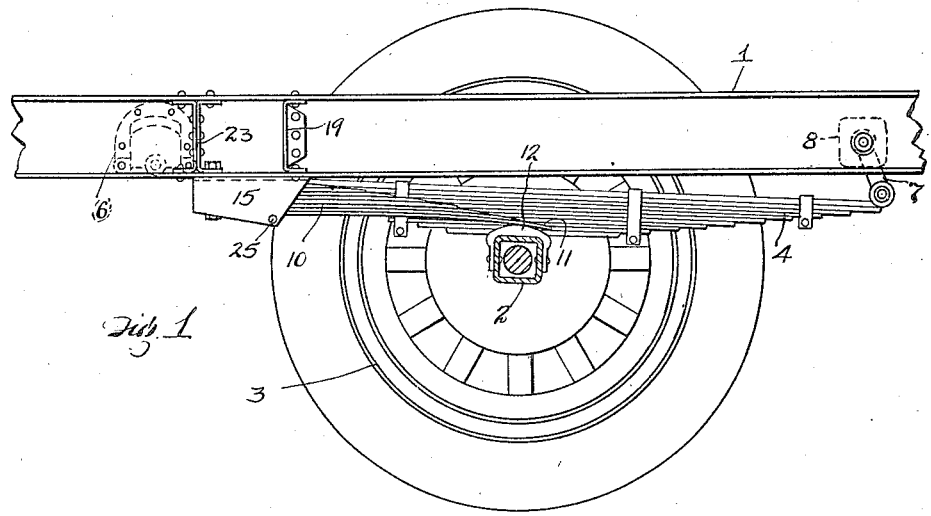
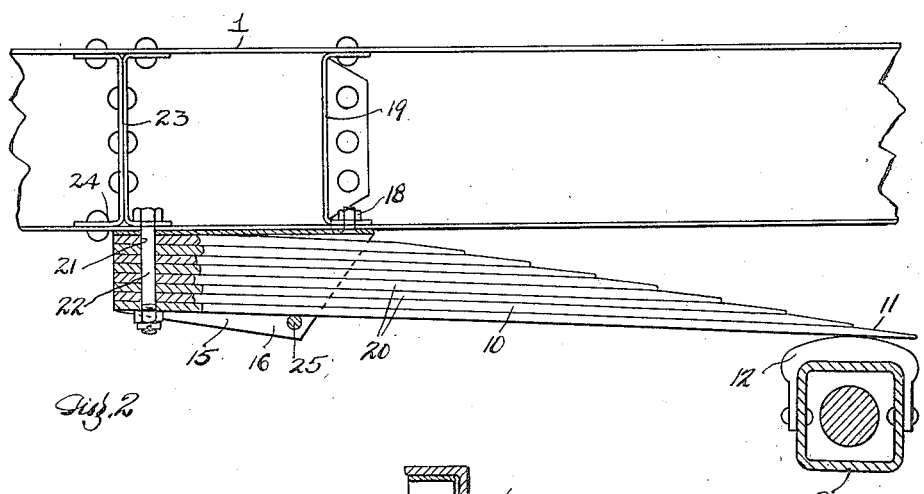
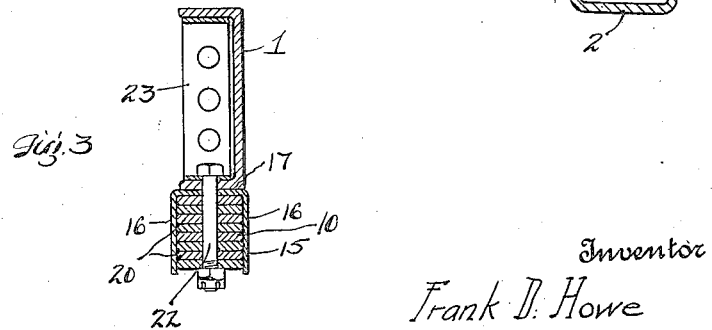
Inventor
Frank D. Howe
By Fay, Oberlin & Fay
Attorneys Patented Nov. 28, 1922.

1,436,803

UNITED STATES PATENT OFFICE.

FRANK D. HOWE, OF KENT, OHIO.

SPRING SUSPENSION.

Application filed November 1, 1920. Serial No. 420,931.

*To all whom it may concern:*

Be it known that I, FRANK D. HOWE, a citizen of the United States, and a resident of Kent, county of Portage, and State of Ohio, have invented a new and useful Improvement in Spring Suspensions, of which the following is a specification, the principle of the invention being herein explained and the best mode in which I have contemplated applying that principle, so as to distinguish it from other inventions.

The present invention relates to auxiliary springs for vehicles and more particularly, to the mounting of such springs. In the present construction, provision is made for suitably attaching the spring to the vehicle frame whereby the stresses are distributed through the frame in such a way as not to overload the frame at any one point. The mounting also provides means for enclosing the fixed end of the spring so that dirt or mud cannot enter and stop the desired action of the same. The mounting also provides a spring which increases in stiffness for load increase so that the main spring carries a substantially even amount of load. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is an elevational view of a vehicle frame and axle showing the present spring suspension; Fig. 2 is a similar view particularly in section but showing the auxiliary spring in detail; and Fig. 3 is the section on the line 3—3 of Fig. 2.

In the present construction, there is shown a vehicle frame 1 which may be of channel or I-beam section together with the rear axle casing 2 and wheel 3 of the vehicle. As here shown, the usual semi-elliptic spring 4 is employed, the spring being connected to the frame at its ends, the forward connection being through a bracket 6 which is riveted or otherwise secured to the frame while the connection at the rear is to a link 7 which is pivotally connected to a bracket 8 which is welded or riveted to the frame member. This is the usual form of spring suspension where a "Hotchkiss" drive is employed, the spring acting as a driving member and driving through the forward spring bracket. In the present suspension, there is an auxiliary spring 10 here shown as a quarter elliptic spring which is mounted directly under the frame member and attached thereto, the rear end 11 of the spring lying normally above the axle housing but being adapted to come in contact therewith whenever the vehicle is loaded to a predetermined point. A suitable spring clip or bearing member 12 is riveted to the axle casing to act as a support for the rear end of this spring.

To attach this spring 10 to the frame, an enclosing case 15 is employed which is preferably formed of sheet metal having its sides 16 bent downwardly to enclose the spring leaves, the upper surface 17 of the case being adapted to fit flat against the bottom of the frame member. This casing, at its rear end, is bolted to the frame member, the bolt 18 extending not only through the frame but also through a reinforcing clip or bracket 19 which fits within the channel members of the frame and which is riveted thereto. The bolt is secured in place either by a nut as shown or by being riveted over, which would naturally occur if the casing and frame were assembled together. At the forward end the spring is provided with an aperture 21 extending through the spring leaves 20 and a bolt 22 is passed through the spring leaves, the casing and the bottom member of the frame channel to secure the spring and the casing to the frame. At this point between the members of the frame, a reinforcing clip or bracket 23 is mounted, the bolt passing through the lower flange 24 of this bracket as well as through the frame members.

The spring itself comprises a plurality of leaves 20, the upper leaf lying in contact with the casing for approximately one-half the length of the same and then curving away from the casing as clearly shown in Fig. 2. At this rear end the sides of the casing extend below the bottom spring leaf and a bolt 25 is passed through this extending portion underneath the spring to stiffen the casing as well as to act as an ordinary spring clip.

This auxiliary spring is normally spaced away from the axle and a predetermined load must be placed on the vehicle before this spring comes in contact with the axle to help carry the load. As soon as the spring contacts the axle housing, further increase of load on the vehicle, tends first to force the entire spring upwardly, lengthening the bearing that the spring has on the casing which is attached to the frame, thus shortening the operating length of the spring and increasing its relative stiffness. This action is increased by the fact that as the axle and the frame move toward each other, the point of contact with the axle moves forwardly along the bottom leaf of the spring, thus again shortening the effective spring length. In this way, the present auxiliary spring furnishes an increased stiffness to every increase in vehicle load so that the normal spring suspension is not overloaded up to the carrying capacity limit of the two springs.

The two brackets or reinforcing clips 19 and 23, which are mounted between the horizontal frame members, prevent the buckling or collapsing of the frame channel and also distribute stresses over a considerable area of the frame so that the tendency of the frame to bend or collapse at the point where the bolt passes through the spring and the frame, is minimized. The use of the casing which encloses the spring leaves, acts to keep the leaves of the spring in alignment and also to prevent undue spreading of the leaves upon upward movement of the frame and it also prevents dirt from entering between the spring leaves. It also protects the tapering opening between the upper spring leaf and the frame from accumulating dirt which would tend to prevent the spring from moving upwardly and thereby increasing its upper bearing length when the load is placed on the vehicle. This casing is adapted to fit snugly against the sides of the leaves but not so tight as to cause any real friction. It is merely a housing for the spring and at the same time acts as means for attaching the spring to the frame so as to satisfactorily distribute the stresses over a large frame area.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a mounting for auxiliary springs, the combination with a vehicle frame, of a enclosing casing adapted to fit snugly under said frame, said casing having downwardly depending sides adapted to fit adjacent the sides of said spring, a bolt adapted to pass through said spring and casing and said frame to secure them together and a second bolt adapted to secure the other end of said casing to said frame, said downwardly depending sides having aligned apertures adapted to receive a rod to support said spring and act as a spring clip.

2. In a mounting for auxiliary spring, the combination of a vehicle frame, two brace members mounted within said frame and spaced apart, a spring casing mounted under said frame and brace members and adapted to be bolted to said frame, said casing having downwardly depending sides adapted to enclose said spring, the forward bolt for said casing being adapted to pass through said spring, said casing, and said frame.

3. In a mounting for auxiliary spring, the combination of a vehicle frame, two brace members mounted within said frame and spaced apart, a spring casing mounted under said frame and brace members and adapted to be bolted to said frame, said casing having downwardly depending sides adapted to enclose said spring, the forward bolt for said casing being adapted to pass through said spring, said casing, and said frame, said depending sides extending below said spring at the rear and being connected by a bolt adapted to act as a spring clip and support for said spring.

4. In a mounting for auxiliary springs, the combination of a vehicle frame, two brace members mounted within said frame and spaced apart, a spring casing mounted under said frame and brace members and adapted to be bolted thereto, said casing having having downwardly depending sides adapted to enclose said spring, the forward bolt for said casing being adapted to pass through said spring, said casing, frame and brace member.

5. In a mounting for auxiliary springs, the combination of a vehicle frame, two brace members mounted within said frame and spaced apart, a spring casing mounted under said frame and brace members and adapted to be bolted thereto, said casing having downwardly depending sides adapted to enclose said spring, the forward bolt for said casing being adapted to pass through said spring, said casing, frame and brace member, said depending sides extending below said spring at the rear and being connected by a bolt adapted to act as a spring clip and support.

6. In a mounting for auxiliary springs, the combination of a frame of channel shape, two reinforcing brackets mounted within said channels and spaced apart said brackets having flanges lying adjacent the bottom member of said frame, a casing mounted under said frame and said brackets, said casing having downwardly depending sides adapted to snugly receive a spring there-between, and means for securing said spring and casing to said frame and brackets including a bolt at the forward end of said casing adapted to pass through aligned apertures in the spring leaves, casing frame member and bracket flange, and a second bolt near the other end of said casing adapted to secure said casing to said frame member and other bracket.

7. In a mounting for auxiliary springs, the combination of a frame of channel shape, two reinforcing brackets mounted within said channels and spaced apart said brackets having flanges lying adjacent the bottom member of said frame, a casing mounted under said frame and said brackets, said casing having downwardly depending sides adapted to snugly receive a spring therebetween, and means for securing said spring and casing to said frame and brackets including a bolt at the forward end of said casing adapted to pass through aligned apertures in the spring leaves, casing frame member and bracket flange, and a second bolt near the other end of said casing adapted to secure said casing to said frame member and other bracket, said depending sides extending below said spring at the rear and being provided with a bolt adapted to stiffen the casing and act with said sides as a spring clip.

Signed by me, this 27 day of October, 1920.

FRANK D. HOWE.